CURRENT-STABILIZED, PUSH-PULL SYNCHRONOUS DEMODULATOR

Filed Aug. 31, 1956 2 Sheets-Sheet 1

INVENTORS
ALTON J. TORRE &
JAMES L. MILLER
BY
[signature]
ATTORNEY

CURRENT-STABILIZED, PUSH-PULL SYNCHRONOUS DEMODULATOR

Filed Aug. 31, 1956

2 Sheets-Sheet 2

INVENTORS
ALTON J. TORRE &
JAMES L. MILLER

BY [signature]

ATTORNEY

United States Patent Office 2,922,838

Patented Jan. 26, 1960

2,922,838

CURRENT-STABILIZED, PUSH-PULL SYNCHRONOUS DEMODULATOR

Alton John Torre, Woodbury, and James L. Miller, Runnemede, N.J., assignors to Radio Corporation of America, a corporation of Delaware Application August 31, 1956, Serial No. 607,361

13 Claims. (Cl. 178—5.4)

Figures 1, 2A, 2B:
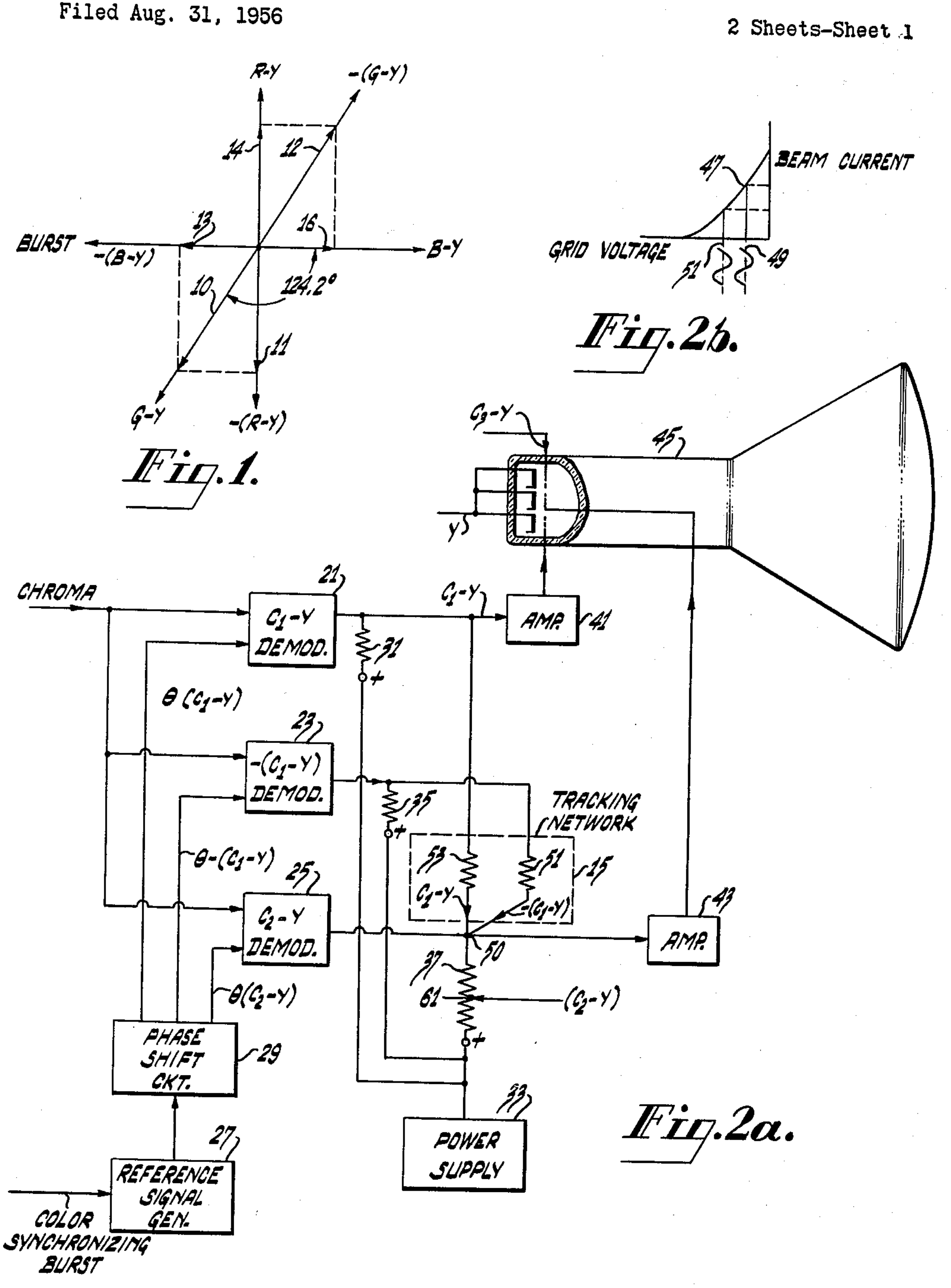

The present invention relates to improved color demodulator circuits wherein the quiescent voltage levels of a plurality of demodulated color difference signals produced from a corresponding plurality of color demodulators, are caused to simultaneously follow variations in operation of the color demodulators.

The color television signal conforming to the standards adopted by the Federal Communications Commission includes a chrominance signal. The chrominance signal contains color difference signal information; each of a wide gamut of color difference signals is included at a phase of the chrominance signal. Color difference signal information can be demodulated from the chrominance signal by synchronous demodulation of the chrominance signal at the phase of each desired color difference signal, using a demodulating wave having the mean frequency of the chrominance signal and having the phase corresponding to the phase of that color difference signal in the chrominance signal.

A plurality of color difference signals can be obtained from a corresponding group of color demodulators. When the output color difference signals of the aforementioned plurality of color demodulators are used to drive a color image reproducer such as a color kinescope, it is important that the direct current quiescent voltage level of each of the demodulated color difference signals be caused to follow or track any changes in the quiescent voltage level of one or more of the demodulated color difference signals, these changes resulting from changes in power supply voltage, demodulating tube emission or demodulating signal amplitude. Otherwise, corresponding color temperature changes and color saturation changes will be produced in the image produced by a color kinescope thereby introducing spurious color information into that image. Quiescent voltage level is hereinafter understood to be that voltage level of an amplifying device which corresponds to the so-called "point of zero excitation" on the voltage-current characteristic curve of the device; see, for example, chapter XII of Fundamentals of Engineering Electronics by Dow, John Wiley, 1937.

It is an object of this invention to provide an improved color demodulator circuit wherein each of a plurality of demodulated color difference signals are caused to track changes in direct current quiescent voltage level of one or more of the demodulated color difference signals.

This object can be accomplished by producing both positive and negative polarities of at least a first of a plurality of the demodulated color difference signals in the output circuits of a first color demodulator. The positive and negative polarities of the aforementioned first color difference signal are both coupled to the output circuit of a second color demodulator which demodulates a second color difference signal, to therein cancel the alternating current components of the positive and negative polarities of the first color difference signal at the second color demodulator and to cause the current through the output circuit of one color demodulator to influence the current flowing through the output circuit of the other color demodulator; the second color difference signal produced therein is thereupon caused to have a direct current level quiescent voltage which follows the direct current quiescent voltage level of the first color difference signal. The aforementioned coupling means also causes the direct current quiescent voltage level of either polarity of the first color difference signal to follow any variation in direct current quiescent voltage level of the second color difference signal.

In a form of the present invention, each of a plurality of color demodulators is designed to have plate impedance of design and magnitude to cause variations in demodulating signal and power supply voltage to cause nearly equal changes in plate voltage; the tapping at an intermediate point of the plate impedance of one of the demodulators will yield a color difference signal having a direct current quiescent voltage level which is related by a ratio to the direct current quiescent voltage level of the color difference signal information provided by the other color demodulators. The present invention, used to couple direct current quiescent voltage variations from one or more plate impedances of color demodulators wherein the plate impedances are not tapped, to the tapped plate impedance, will maintain the ratio between the direct current quiescent voltage level of the color difference signal information provided from the tapped plate impedance and from the untapped plate impedance substantially constant.

Figure 3:
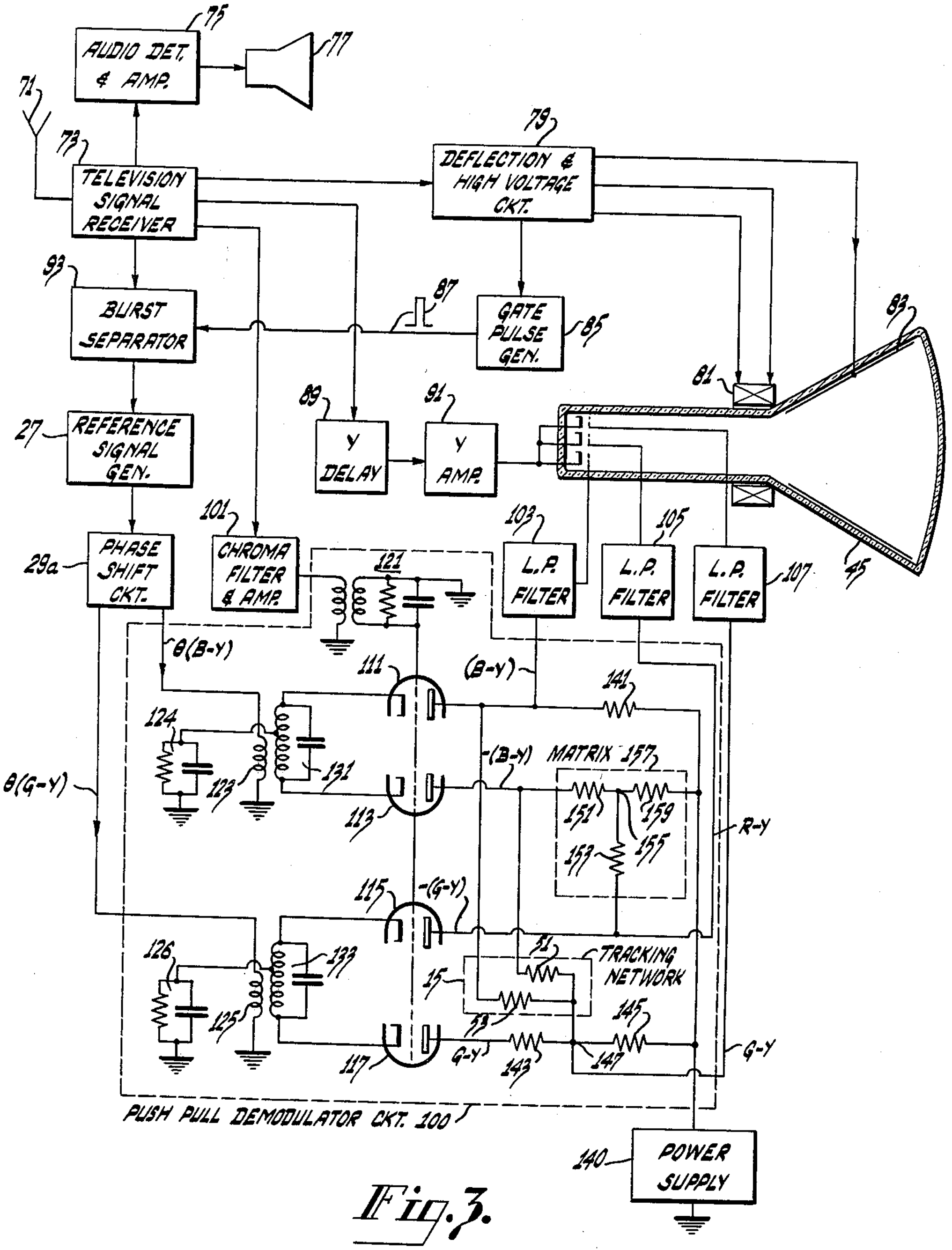

Other and incidental objects of this invention will become apparent upon a reading of the specification and a study of the figures, where:

Figure 1 is a vector diagram relating color difference signal information to phases of the chrominance signal;

Figure 2*a* is a block diagram of one form of the present invention;

Figure 2*b* is a grid-voltage versus beam-current characteristic curve of the kinescope of Figure 2*a*, and Figure 3 is a diagram of a color television receiver including a schematic diagram of a push-pull demodulator circuit utilizing the present invention.

In order that the benefits of the present invention will be more fully appreciated, a discussion of pertinent aspects relating to the nature of the color difference signal information in the chrominance signal will be presented prior to a description of structures and circuits of the invention.

Figure 1 is a vector diagram illustrating the phases of pertinent color difference signal information in the chrominance signal. The various phases of the chrominance signal are referred to a reference phase also known as burst phase. In order to make synchronous demodulation possible in a circuit remote from a broadcast transmitter, color synchronizing bursts conveying reference phase or burst phase information are transmitted on the "back porch" of each horizontal synchronizing pulse.

Three important color difference signals which are used to drive a kinescope in combination with luminance information, which is also transmitted in the color television signal, are the so-called $R-Y$, $B-Y$ and $G-Y$ color difference signals; R, G and B denote red, green and blue respectively, and Y denotes the luminance signal which represents the monochrome information of a televised color image. When a color difference signal is added to the luminance signal, the resulting signal is a component color signal. $R-Y$, $B-Y$ and $G-Y$ color difference signals are narrow band color difference signals having a bandwidth less than 1½ mc. whereas the luminance or Y signal includes components in the range from substantially 0 to 4.2 mc.

The vector diagram of Figure 1 shows that vectors representing the $R-Y$ and $B-Y$ color difference signals are included in the chrominance signal or chroma at phases lagging the burst phase by 90° and 180°, respectively. The phase of the $G-Y$ color difference signal lags the phase of the $B-Y$ color difference signal by 124.2°. The vector diagram of Figure 1 further indicates that the negative polarity of each of the aforementioned color difference signals is 180° out of phase with respect to the phase of the positive polarity of the corresponding color difference signal.

In many color television receivers, three color difference signals, say the $R-Y$, $B-Y$ and $G-Y$ color difference signals, are produced by directly demodulating at least two of the aforementioned color difference signals from the chrominance signal, and by then forming the third color difference signal using suitable amplitudes and opposite polarities of the two demodulated color difference signals. For example, if color demodulators provide not only the $R-Y$ and $B-Y$ color difference signals but also the $-(R-Y)$ and $-(B-Y)$ color difference signals, it folows from the vector diagram of Figure 1 that the $G-Y$ vector 10 included there may be formed by the vector sum of the $-(R-Y)$ vector 11 and the $-(B-Y)$ vector 13.

Other sets of color difference signal information may be developed and combined to form the three desired color difference signals. For example, a circuit providing both $R-Y$, $-(R-Y)$, and $-(G-Y)$ color difference signals may be adapted to combine selected magnitudes of the $-(R-Y)$ and $-(G-Y)$ color difference signals to produce a $B-Y$ color difference signal. In like fashion, when $-(G-Y)$, and $-(B-Y)$ color difference signals are formed by suitable demodulators; these color difference signals may be combined to provide an $R-Y$ color difference signal. The latter named combination will be produced in the push-pull demodulator circuit 100 to be described in Figure 3 of this specification.

The formation of an $R-Y$ color difference signal from $-(G-Y)$ and $-(B-Y)$ color difference signals may be illustrated by using vectors included in Figure 1. The $-(G-Y)$ vector 12 of Figure 1 is seen in that figure to be the vector sum of the $R-Y$ vector 14 and the $B-Y$ vector 16. The $B-Y$ vector 16 is a vector of the same magnitude, but of opposite polarity, as the corresponding $-(B-Y)$ vector 13. Addition of the $-(G-Y)$ vector 12 and the $-(B-Y)$ vector 13 will cancel the $B-Y$ vector 16 in the $-(G-Y)$ vector 12 leaving only the $R-Y$ vector 14.

Figure 2*a* is a diagram of a demodulator circuit utilizing a quiescent voltage level tracking network 15 (hereinafter referred to as a tracking network 15 in the present application), of the present invention. The tracking network 15 provides for direct-current quiescent voltage level tracking in a circuit including demodulators which demodulate a $C_1-Y$, $-(C_1-Y)$ and a $C_2-Y$ color difference signal; that is, the quiescent voltage level of each of the demodulated $C_1-Y$, $-(C_1-Y)$ and $C_2-Y$ color difference signals is caused to track or follow the direct-current output variations of each demodulator, caused by variations in power supply voltage or demodulator operation. $C_1-Y$ and $C_2-Y$ denote any pair of a plurality of color difference signals required from a demodulator circuit.

The demodulator circuit of Figure 2*a* employs the $C_1-Y$ demodulator 21, the $-(C_1-Y)$ demodulator 23 and the $C_2-Y$ demodulator 25. The $-(C_1-Y)$ demodulator 23 produces a color difference signal which is of opposite polarity with respect to the color difference provided by the $C_1-Y$ demodulator 21. The chrominance signal or chroma is applied simultaneously to the $C_1-Y$ demodulator 21, to the $-(C_1-Y)$ demodulator 23, and to the $C_2-Y$ demodulator 25.

A color synchronizing burst is used to control a reference signal generator 27 which produces an accurately phased reference signal having the frequency of the required demodulating signals and having a phase related to the phase of the bursts. The output of the reference signal generator 27 is applied to the phase shift circuit 29 which develops a trio of demodulating signals having phases corresponding to the $C_1-Y$, $-(C_1-Y)$ and $C_2-Y$ color difference signals; the latter named demodulating signals, denoted as $(C_1-Y)$, $-(C_1-Y)$ and $(C_2-Y)$, respectively, are applied to the corresponding demodulators of the demodulator circuit of Figure 2.

The $C_1-Y$ demodulator employs an output load 31 which is coupled to the power supply 33. In like fashion, the $-(C_1-Y)$ demodulator 23 and the $C_2-Y$ demodulator 25 include the output loads 35 and 37, respectively. The color difference signals representing the $C_1-Y$, $-(C_1-Y)$ and $C_2-Y$ color difference signals are developed across the output loads 31, 35 and 37, respectively. Each of the demodulators 21, 23 and 25 provides an output color difference signal at a direct current quiescent voltage level which is dependent upon the amplitude of the demodulating signals from the phase shift circuit 29, the voltage provided by the power supply 33 which supplies power to each of the demodulators by way of output loads 31, 35 and 37, and the values and characteristics of the components of the demodulator, these components consisting typically of resistors, tubes, rectifiers or transistors. The $C_1-Y$ and $C_2-Y$ color difference signals are D.C. coupled by way of the amplifiers 41 and 43 to two of the control electrodes of the kinescope 45. A $C_3-Y$ color difference signal, produced either by a separate demodulator or by combining negative polarities of the $C_1-Y$ and $C_2-Y$ color difference signals is applied to a third control electrode of the kinescope 45.

The importance of tracking the quiescent direct-current levels of each of the color difference signals applied to the control electrodes of the kinescope 45 may be understood by considering the beam-current versus grid-voltage characteristic curve 47 illustrated in Figure 2*b*. Color difference signal variations produced alternatively at the different quiescent grid voltage levels, say 49 and 51, will each introduce identical alternating-current color difference signal components, though at different D.C. level, into the beam current of the electron gun to which that color difference signal information is applied. However, it follows that the grid voltage level 49 will produce a higher level of kinescope beam current than will the grid voltage level 51, thereby producing the condition of different brightness and therefore different saturation for the color image information of the reproduced image on the image face of the kinescope 45, produced by the electron beam from that electron gun. The spurious change in the direct current quiescent voltage level of one of a plurality of color difference signals applied to one of a plurality of electron guns of a color kinescope will therefore cause a change in brightness of one color which, if not accompanied by at least a corresponding change in brightness of the other colors, will result in spurious color image reproduction.

The $C_1-Y$ and $C_2-Y$ color difference signals provided by the $C_1-Y$ domodulator 21 and the $C_2-Y$ demodulator 25 may be caused to track during changes in power supply and demodulating signal amplitude and demodulator performance by using the tracking network 15 of the present invention. The tracking network 15 of Figure 2*a* includes a resistor 51 which couples a prescribed magnitude of $-(C_1-Y)$ color difference signal information from the output load 35 of the $-(C_1-Y)$ demodulator 23 to the terminal 50 of the output load 37 of the $C_2-Y$ demodulator 25. In like fashion, a corresponding magnitude of $C_1-Y$ color difference signal information is coupled from the $C_1-Y$ demodulator 21 to the terminal 50 of the output load 37. The $C_1-Y$ and $-(C_1-Y)$ color difference signals developed at the terminal 50 will cancel at that terminal. However, any variation in direct current level of the outputs of the $C_1-Y$ demodulator and the $-(C_1-Y)$ demodulator 23 will be in the same polarity and will be simultaneously applied to the output load 37 of the $C_2-Y$ demodulator 25 to cause the direct current level of the signal developed at the output load 37 to track the direct current level of the signals produced across the output loads 31 and 35.

The tracking network 15 of Figure 2*a* operates bidirectionally; that is, the direct current quiescent voltage level of the color difference signal produced across the output loads 31 and 35 will be caused to track the direct current quiescent voltage level of the $C_2-Y$ color difference signal produced across the output load 37 of the $C_2-Y$ demodulator 25.

Figure 3 is a diagram of a color television receiver which uses a form of the present invention to cause the direct current level of each of a trio of color difference signals produced by a push-pull demodulator circuit 100 to track.

In the color television receiver of Figure 3 the broadcast signal from a television broadcasting station is received by the antenna 71 and applied to the television signal receiver 73. The television signal receiver detects the incoming signal; the detected signal is a color television signal which includes not only the aforementioned chrominance signal and luminance signal but also picture deflection synchronizing signals, color synchronizing bursts and also a sound-modulated frequency-modulated carrier which is transmitted 4½ mcs removed from the carrier on which the picture components of the incoming signal are transmitted.

Using, for example, an intercarrier sound circuit, the sound information is demodulated from the frequency-modulated carrier in the audio detector and amplifier 75 and applied therefrom to the loud speaker 77.

The picture deflection synchronizing signals are separated from the color television signal in the deflection and high voltage circuit 79 wherein vertical and horizontal deflection signals and a high voltage are developed. The vertical and horizontal deflection signals are applied to the deflection yokes 81, and the high voltage is applied to the ultor 83 of the color kinescope 45.

The deflection and high voltage circuit 79 also energizes a gate pulse generator 85 which develops a gate pulse 87 whose duration interval is substantially in coincidence with the duration interval of each of the color synchronizing bursts, which follows the horizontal synchronizing pulse in the color television signal. The gate pulse generator 85 may take the form of a winding on a high voltage transformer in the deflection and high voltage circuit 79 or may be a multivibrator which is responsive to the horizontal synchronizing pulses.

The color television signal, when not subjected to synchronous demodulation, constitutes principally a luminance or Y signal. This luminance or Y signal is given proper time delay in the Y delay line 89, amplified in the Y amplifier 91 and applied to the cathodes of the electron guns of the color kinescope 45.

The gate pulse 87 and the color television signal are applied to burst separator 93 which is a gate circuit wherein the color synchronizing bursts are separated from the color television signal responsive to the gate pulse 87. The color synchronizing bursts are thereupon applied to the reference signal generator 27 which develops a reference signal having the frequency of the color synchronizing bursts and a phase which is accurately synchronized to a phase prescribed by the color synchronizing bursts. The reference signal generator 27 applies a reference signal to the phase shift circuit 29*a* which develops a pair of properly phased demodulating signals which are thereupon applied to the push-pull demodulator circuit 100.

The color television signal is also applied to the chroma filter and amplifier 101, which selects the chrominance from the color television signal, amplifies the chrominance signal and applies the amplified chrominance signal to the push-pull demodulator circuit 100. The push-pull demodulator circuit 100, using a circuit to be described in detail and employing a tracking circuit 15 of the present invention, develops an $R-Y$, $B-Y$ and $G-Y$ color difference signal. The $B-Y$, $R-Y$ and $G-Y$ color difference signals are therefore applied by way of the low pass filters 103, 105 and 107, respectively, to the corresponding control grids of the electron guns of the color kinescope 45. The low pass filters 103, 105 and 107 are filters having pass bands from zero to approximately 1 mc. thereby preventing signals in the burst and chrominance signal frequency range from being applied to the control electrodes of the color kinescope. The color difference signals are each combined with the luminance signal in the respective electron guns of the color kinescope 45 to provide modulations in the electron beams representative of the component color signals which represent the televised image. It is to be appreciated that the combining or adding of each color difference signal to the luminance signal can be alternatively performed in a circuit independent of the color kinescope 45 with the resulting component color signals used to control the electron beams issuing from the electron guns.

The push-pull demodulator circuit 100 is a demodulator circuit which not only provides the $R-Y$, $B-Y$ and $G-Y$ color difference signals at high level but which also is uniquely suited for employing the tracking network 15 of the present invention. The push-pull demodulator circuit 100 uses four demodulator tubes 111, 113, 115 and 117. The chrominance signal from the chroma filter and amplifier 101 is developed across the wide band resonant circuit 121 and applied therefrom to the control grids of each of the demodulator tubes 111, 113, 115 and 117. The phase shift circuit 29*a* provides demodulating signals having the phases of the $B-Y$ and $G-Y$ color difference signals in the chrominance signal. The demodulating signals are applied to the coils 123 and 125, respectively; these demodulating signals are denoted in the drawing of Figure 3 as $\theta$ $(B-Y)$ and $\theta$ $(G-Y)$. The resistance-condenser networks 124 and 126 function as biasing networks for the pairs of demodulator tubes 111, 113 and 115, 117, respectively.

The demodulating signal having the $B-Y$ phase and developed across the coil 123, is used to energize the resonant circuit 131 which drives the cathode of the tube 111 in the $B-Y$ phase and the cathode of the demodulator 113 in the $-(B-Y)$ phase. In like fashion, the $G-Y$ phased demodulating signal developed across the coil 125 is used to energize the resonant circuit 133 to therefrom drive the cathode of the demodulator tube 115 in the $-(G-Y)$ phase and the cathode of the demodulator tube 117 in the $G-Y$ phase.

The anode of the demodulator tube 111 is coupled to the power supply 140 by way of the anode resistance 141: the $B-Y$ color difference signal is developed across the anode resistance 141 and applied therefrom to the low pass filter 103.

The anode of the demodulator tube 117 is coupled by way of the serially connected anode resistors 143 and 145 to the power supply 140. The terminal 147, at the common connection of the anode resistors 143 and 145, thereupon provides a "tapped down" magnitude of a $G-Y$ color difference signal according to a voltage ratio which is proportional to the magnitude of the anode resistor 143 relative to the total resistance provided by the anode resistors 143 and 145. The anodes of the demodulator tubes 113 and 115, at which are developed $-(B-Y)$ and $-(G-Y)$ color difference signals, respectively, are coupled by way of anode resistors 151 and 153, respectively, to the terminal 155 of the resistance matrix 157. The terminal 155 is coupled by way of the resistance 159 to the power supply 140.

The anode resistors 151 and 153 are properly proportioned to provide proper magnitudes of $-(B-Y)$ and $-(G-Y)$ color difference signals at the terminal 155 to combine these color difference signals there to thereby provide at the anode of the demodulator tube 115 an $R-Y$ color difference signal which is applied therefrom to the low pass filter 105. The resistance 159 is proportioned to cause the $R-Y$ color difference signal to have a proper amplitude relative to the amplitudes of the $B-Y$ and $G-Y$ color difference signals provided from the demodulator tube 111 and the terminal 147, respectively.

For reasons already discussed in this application, it is important that the direct current quiescent voltage or current level of each of the color difference signals developed by the push-pull demodulator circuit 100 be caused to track during changes in power supply voltage provided by the power supply 140, during changes in demodulating signal amplitude, and during changes in operation and emission of the demodulator tubes 111, 113, 115 and 117. In view of the fact that the $G-Y$ color difference signal is developed at the terminal 147 according to a voltage ratio which is a function of the amplitude of the anode resistance 143 to the total resistance provided by the anode resistors 143 and 145, it is also important that the magnitude of the $G-Y$ color difference signal, relative to the magnitude of the $R-Y$ and $B-Y$ color difference signals, not change during the aforementioned variations in power supply, demodulating signal and demodulating tube output voltages. The tracking network 15 is thereupon coupled from the anodes of demodulator tubes 111 and 113 to the terminal 147 at which terminal the $G-Y$ color difference signal is developed. The tracking network includes the resistors 51 and 53 which are proportioned to provide equal amplitudes of $B-Y$ and $-(B-Y)$ color difference signal information at the terminal 147. The alternating current components of the $B-Y$ and $-(B-Y)$ color difference signal information thereupon cancels at the terminal 147 but since the quiescent voltage levels of the anodes of the demodulator tubes 111 and 113 will vary in the same direction with changes in power supply, demodulating signal and demodulator tube output voltage, it follows that the quiescent voltage level of the $G-Y$ color difference signal developed at the terminal 147 will track the aforementioned changes experienced at the anodes of the demodulator tubes 111 and 113. It also follows that the tracking network 15 causes changes experienced at the direct current quiescent voltage level at any of the anodes of one or more of the demodulator tubes 111, 113, 115 and 117 to be tracked by the direct current quiescent voltage level of the output signals of the other demodulator tubes.

Having described the invention, what is claimed is:

1. In a color television receiving system, the combination comprising, means providing color intelligence signals; a plurality of color intelligence signal circuits each having an output and an input circuit and adapted to develop a signal in each of said output circuits which is related to a corresponding signal applied to said respective input circuits and having a direct current quiescent voltage level which is dependent upon current passing through the respective color intelligence signal circuit; means coupling said color intelligence signal to each of said input circuits of said plurality of said color intelligence signal circuits; and network means coupled between selected output circuits of at least a first and second of said plurality of color intelligence signal circuits providing an exchange of current between said first and second color intelligence signal circuits to cause the direct current quiescent voltage level of a related color intelligence signal produced in the output circuit of one of said first and second color intelligence signal circuits to track the direct current quiescent voltage level of the color intelligence signal produced in the output circuit of the other of said first and second color intelligence signal circuits.

2. In a color television receiver the combination comprising, means providing color intelligence signals; a plurality of color intelligence signal circuits each having an output and an input circuit and adapted to derive a signal in each of said output circuits which is related to a corresponding signal applied to the respective input circuits and having a direct current quiescent voltage level which is dependent upon current passing through the respective color intelligence signal circuit, at least two of said color intelligence signal circuits including means to derive both first and second polarities of a prescribed signal in response to said respective applied signal; means to couple said color intelligence signal to each of said input circuits of said plurality of said color intelligence signal circuits; and network means coupled between selected output circuits of said two color intelligence signal circuits to a third color intelligence signal circuit to provide an exchange of current between the three color intelligence signal circuits to cause the direct current quiescent voltage levels of a color intelligence signal produced in the output circuits of the three color intelligence signal circuits to track.

3. In a color television receiver adapted to receive a color television signal including a chrominance signal and color synchronizing bursts, each of said bursts having a reference phase, the combination of: means for deriving said chrominance signal from said color television signal; a plurality of color demodulators each having an output circuit through which demodulator current is passed; and means connecting said plurality of color demodulators to said chrominance signal deriving means; means to cause each of said plurality of color demodulators to demodulate at a different phase of said chrominance signal as referred to said reference phase to produce modulated current corresponding to different prescribed color difference signals at a quiescent voltage level in each of said output circuits; and resistive network means coupled between the output circuits of a group of said plurality of color demodulators to provide an exchange of portions of color demodulator currents between said plurality of color demodulators to provide tracking of the quiescent voltage level of the color difference signals produced in each of said output circuits of the color demodulators.

4. In a color television receiver adapted to receive a composite television signal the combination comprising, means providing a chrominance signal from said composite signal; a plurality of demodulators each having an input circuit and an output load to provide demodulator current representative of a selected color difference signal in response to the application of a chrominance signal to said input circuit, said selected color difference signal having an average level dependent on said demodulator current; means coupling said chrominance signals to each of said input circuits of said plurality of demodulators to cause a prescribed color difference signal to be produced across said output load of each of said plurality of demodulators; and network means coupled between the output loads of a group of said plurality of demodulators to the output load of a selected one of said plurality of demodulators to substantially cancel alternating current components of the color difference signal information produced at the output loads of said group of demodulators at said output load of said selected demodulators, said network means being operative to translate demodulator current from said group of demodulators to said selected demodulator to cause the direct-current quiescent level of demodulator current in other output loads in other demodulators of said plurality of demodulators to control the direct current quiescent level of the demodulator current in said output load of said selected demodulator.

5. In a color television receiver adapted to receive a color television signal including a chrominance signal and color synchronizing bursts, each of said bursts having a reference phase, the combination of: means for deriving a chrominance signal from said color television signal; a plurality of color demodulators each including a demodulator device having an output terminal; output circuit means including a resistance load connected to each of said output terminals; each of said color demodulators being operative to provide a selected color difference signal having a quiescent voltage level at said output terminal; means operatively connecting said chrominance signal deriving means to each of said input circuits; means to cause each of said plurality of color demodulators to demodulate at a different phase of said chrominance signal as referred to said reference phase to produce a prescribed and different color difference signal in each of said output circuits, at least two of said color difference signals comprising the positive and negative portion of a first color difference signal; means providing a tap on one of said resistance loads for deriving a second color difference signal having an amplitude in accordance with a ratio determined by both the position of said tap and the total resistance of said one of resistance loads; and network means coupled between said tap and the output circuits of said plurality of color demodulators at which are developed said positive and negative polarities of said first color difference signal to cause cancellation of alternating current components of said positive and negative polarities of said first color difference signal at said tap and to control the quiescent voltage level of the color difference signals produced in each of the output circuits of the color demodulators.

6. In a color television receiver adapted to receive a color television signal including a chrominance signal and color synchronizing bursts, the combination of: means to separate said chrominance signal from said color television signal; means to separate said color synchronizing bursts from said color difference signal, means for developing a first and second demodulating signal each having a phase related to a phase of said chrominance signal in response to the separated bursts; a first, second and third color demodulator each having an output circuit; means to apply said chrominance signal to each of said first, second and third color demodulators; means to apply said first demodulating signal in selected polarities to said first and second color demodulators to develop color difference signal of first and second polarities corresponding to the phase of said first demodulating signal across the output circuit of said first and second color demodulators respectively; means to apply said second demodulating signal to said third color demodulator to develop a second and different color difference signal corresponding to the phase of said second demodulating signal across the output circuit of said third demodulator; network means operatively connected between the output circuits of said first, second and third color demodulators to couple information relating to selected amplitudes of said first and second polarities and the direct current amplitude level of said color difference signal from the output circuits of said first and second color demodulators, respectively, to the output circuit of said third-color demodulator.

7. In a color television receiver adapted to receive a color television signal including a chrominance signal and color synchronizing bursts, said chrominance signal comprising a modulated subcarrier including modulations representative of a plurality of color difference signals each at a phase of said chrominance signal relative to a reference phase, said color synchronizing bursts having said reference phase; the combination of: means to separate said chrominance signal from said color television signal; means for developing a reference signal synchronized to a phase related to said reference phase in response to said bursts; first demodulator means coupled to said chrominance signal separation means and to said reference signal developing means to develop a first color difference signal corresponding to information at a first phase of said chrominance signal in response to said chrominance signal, said first color difference signal occurring in said first demodulator means with a quiescent current and voltage; a second demodulator means coupled to said chrominance signal separation means and to said reference signal developing means to develop a second color difference signal corresponding to information at a second phase of said chrominance signal in response to said chrominance signal; and circuit means to couple current representing the quiescent voltage and current level in said first demodulator means from said first demodulator means to said second demodulator means to cause the quiescent voltage and current level of said second color difference signal occurring in said second demodulator means to follow the quiescent voltage and current level of said first color difference signal occurring in said first demodulator means.

8. In a color television receiver adapted to receive a color television signal including a chrominance signal and color synchronizing bursts, the combination of: means to separate said chrominance signal from said color television signal; a first, second, third and fourth color demodulator each having an output circuit through which both components of derived signals are passed at quiescent voltage and current levels, means to separate said color synchronizing bursts from said color television signal, means for developing a first and second demodulating signal having different phases related to phases of said chrominance signal in response to said separated bursts; means to apply said chrominance signal to each of said first, second, third and fourth color demodulators; means to apply said first demodulating signal in selected and different polarities to said first and second color demodulators to cause said first and second color demodulators to provide a first color difference signal of first and second polarities in the output circuits of said first and second color demodulators respectively, said first color difference signal corresponding to information at the phase of said first demodulating signal in said chrominance signal; means to apply said second demodulating signal in selected and different polarities to said third and fourth color demodulators to casue said third and fourth color demodulators to develop a second color difference signal of first and second polarities in the output circuits of said third and fourth demodulators respectively, said second color difference signal corresponding to information at the phase of said second demodulating signal in said chrominance signal; network means operatively connected to couple selected portions of said first and second polarities of said first color difference signal and also current representing the quiescent voltage level of said first and second demodulators from the output circuits of said first and second color demodulators to the output circuit of said third color demodulator to cause the quiescent voltage level of the color difference signals produced in the output circuits of each of said first, second and third color demodulators to track; and circuit means to combine the first and second color difference signals provided by said second and fourth color demodulators to form a color difference signal corresponding to color difference signal information at a phase of said chrominance signal different from the phase of said first and second demodulating signals.

9. In a color television receiver for receiving a color television signal, the combination comprising, means providing a chrominance signal from said color television signal; a plurality of push-pull demodulators each having an input circuit and a pair of output loads through which is passed demodulator current, each of said push-pull demodulators being capable of producing positive and negative polarities of a selected color difference signal from a chrominance signal applied to said input circuit at a quiescent voltage level dependent on said demodulator current; means to couple said chrominance signal to each of said input circuits of said plurality of push-pull demodulators to develop a predetermined color difference signal of prescribed polarity across the pair of output loads of each push-pull demodulator; and resistance means coupled from the pair of output loads of a first push-pull demodulator to a selected one of the pair of output loads of a second push-pull demodulator to substantially cancel alternating current components of the color difference signal information produced at the pair of output loads of said first push-pull demodulator in said output load of said second push-pull demodulator and to pass current representative of the quiescent voltage level of said first push-pull demodulator to said output load of said second push-pull demodulator to cause the quiescent voltage level of the demodulator current in said pair of output loads in said first push-pull demodulator to control the quiescent voltage level of the demodulator current in said selected output load of said second push-pull demodualtor.

10. In a color television receiver including a $B-Y$ demodulator, a $-(B-Y)$ demodulator and a $G-Y$ demodulator, each of said demodulators including an output load circuit having an output terminal thereon for providing a corresponding color difference signal, the output terminal on said $G-Y$ demodulator load circuit being tapped down to provide an output signal of lesser amplitude than is provided at the output terminals of the other demodulators, means to prevent unbalancing of the relative direct current levels of the color difference signals due to changes such as changes in B+ voltage, demodulating reference signal amplitude, and tube aging, comprising: a first resistor connected from the output load circuit of the $B-Y$ demodulator to a point on the output load circuit of the $G-Y$ demodulator, a second resistor connected from the output load circuit of the $-(B-Y)$ demodulator to said point on the output load circuit of the $G-Y$ demodualtor, said first and second resistors being proportioned to couple equal and cancelling amplitudes of said $B-Y$ and $-(B-Y)$ alternating current color difference signals to said point, said first and second resistors being further proportioned so that the direct current quiescent voltage at the $G-Y$ output terminal tracks with the direct current quiescent voltage at the output terminals of the $B-Y$ and $-(B-Y)$ demodulators.

11. In a color television receiver including a $C_1-Y$ demodulator, a $-(C_1-Y)$ demodulator and a $C_2-Y$ demodulator, each of said demodulators including an output load circuit having an output terminal thereon for providing a corresponding color difference signal, the output terminal on said $C_2-Y$ demodulator load circuit being tapped down to provide an output signal of lesser amplitude than is provided at the output terminals of the other demodulators, means to prevent unbalancing of the relative direct current levels of the color difference signals due to changes such as changes in B+ voltage, demodulating reference signal amplitude, and tube aging, comprising: a first resistor connected from the output load circuit of the $C_1-Y$ demodulator to a point on the output load circuit of the $C_2-Y$ demodulator, a second resistor connected from the output load circuit of the $-(C_1-Y)$ demodulator to said point on the output load circuit of the $C_2-Y$ demodulator, said first and second resistors being proportioned to couple equal and cancelling amplitudes of said $C_1-Y$ and $-(C_1-Y)$ alternating current color difference signals to said point, said first and second resistors being further proportioned so that the direct current quiescent voltage at the $C_2-Y$ output terminal tracks with the direct current quiescent voltage at the ouput terminals of the $C_1-Y$ and $-(C_1-Y)$ demodulators.

12. In a color television receiver, a $C_1-Y$ demodulator, a $-(C_1-Y)$ demodulator and a $C_2-Y$ demodulator, each of said demodulators including an output load circuit having an output terminal thereon for providing a corresponding color difference signal, the output terminal on said $C_2-Y$ demodulator load circuit being tapped down to provide an output signal of lesser amplitude than is provided at the output terminals of the other demodulators, a first resistor connected from the output load circuit of the $C_1-Y$ demodulator to a point on the output load circuit of the $C_2-Y$ demodulator, a second resistor connected from the output load circuit of the $-(C_1-Y)$ demodulator to said point on the output load circuit of the $C_2-Y$ demodulator, said first and second resistors being proportioned to couple equal and cancelling amplitudes of said $C_1-Y$ and $-(C_1-Y)$ signals to said point, said first and second resistors being further proportioned so that the direct current quiescent voltage at the $C_2-Y$ output terminal tracks with the direct current quiescent voltage at the output terminals of the $C_1-Y$ and $-(C_1-Y)$ demodulators, whereby the direct current levels of the said color difference signals remain in balance despite changes such as in the B+ voltage, the demodulating reference signal amplitude and tube aging.

13. In a color television receiver including first and second terminals providing opposite polarity versions of a color difference signal, and including a third terminal providing another color difference signal having a different direct current level, means to prevent unbalancing of the relative direct current levels of the color difference signals due to changes such as changes in B+ voltage, demodulating reference signal amplitude, and tube aging, comprising: a first resistor connected from said first terminal to said third terminal, a second resistor connected from said second terminal to said third terminal, said resistors being proportioned to couple equal and cancelling amplitudes of the opposite polarity alternating current color difference signals to said third terminal, said resistors being further proportioned so that the direct current level of the other color difference signal tracks with the direct current level of the opposite polarity color difference signals.

References Cited in the file of this patent

UNITED STATES PATENTS

| | | |
|---|---|---|
| 2,680,147 | Rhodes | June 1, 1954 |
| 2,743,310 | Schroeder | Apr. 24, 1956 |

OTHER REFERENCES

Color TV, Rider Publication, March 1954, pages 141 and 142.